UNITED STATES PATENT OFFICE 2,634,263

MONOAZO DYESTUFFS

Willy Steinemann, Basel, Switzerland, assignor to Sandoz A. G., Basel, Switzerland, a Swiss firm No Drawing. Application June 26, 1950, Serial No. 170,459. In Switzerland July 21, 1949

6 Claims. (Cl. 260—199)

The present invention relates to new metallizable monoazo dyestuffs which, when used for dyeing wool by the after-chroming or single bath process, yield beautiful grey, grey-blue and blue shades of excellent fastness to light, washing, fulling and carbonizing.

It is a desideratum in this type of dyestuff that the dyestuff be of good solubility so that it may be worked with ease. This solubility must, however, be realized without impairing the fastness properties of the dye.

A primary object of the present invention is the embodiment of a new group of metallizable monoazo dyestuffs which satisfy the aforesaid desideratum of good solubility without involving impaired fastness properties thereof but rather involving enhanced fastness properties.

Thsi new group of dyestuffs correspond to the formula

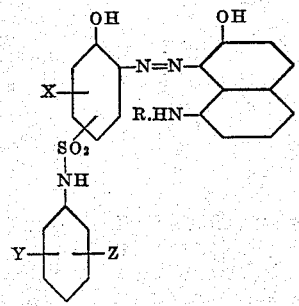

wherein X stands for hydrogen or halogen, each of Y and Z stands for hydrogen, lower alkyl, halogen, —COOH, —SO₂NH₂, —SO₂.NH-lower alkyl or —SO₂.N-(lower-alkyl)₂, and R stands for —CO-alkyl, —CO-alkylene-COOH, —CO-aralkyl, —CO-aryl, —COO-alkyl or —COO-alkylene-O-alkyl.

The said dyestuffs may be prepared by coupling a diazotized 2-aminophenol-sulphonic acid amide which corresponds to the formula

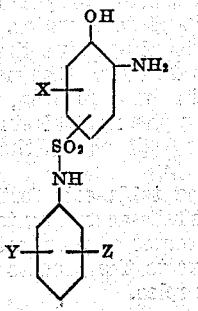

wherein X, Y and Z have the afore-indicated significances, with a 1-amino-7-naphthol which corresponds to the formula

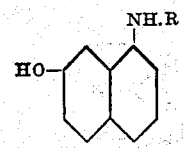

wherein R has the precedingly-indicated significance.

A wide variety of 2-aminophenol-sulfonamides may be employed in the process of the invention, illustrative of these being the following: 2-aminophenol-4-sulfonic acid-(2'-sulfomethylamido)-anilide, 2-aminophenol-4-sulfonic acid-(2'-sulfodimethylamido)-anilide, 2-aminophenol-4-sulfonic acid-anilide, 2-aminophenol-4-sulfonic acid - anthranilide, 2 - aminophenol - 4 - sulfonic acid - p - toluidide, 2 - aminophenol - 4 - sulfonic acid - (3' - sulfamido) - anilide, 2 - aminophenol-5-sulfonic acid-anthranilide, 4-chloro-2-aminophenol-5-sulfonic acid-anthranilide, 6-chloro-2-aminophenol-4-sulfonic acid-anthranilide, 2-aminophenol - 4 - sulfonic acid-4'-chloro-3'-carboxyanilide, 2-aminophenol-4-sulfonic acid-3'-carboxyanilide and 2-aminophenol-4-sulfonic acid-4'-carboxy-anilide, etc.

Illustrative of the wide variety of coupling components which may be used according to the invention are the following: 1-acetylamino-7-naphthol, 1-chloracetylamino-7-naphthol, 1-propylamino - 7 - naphthol, 1 - n-butyrylamino-7 - naphthol, 1 - sulfoacetylamino - 7 - naphthol, 1-succinylamino-7-naphthol, 1-adipinylamino-7-naphthol, 1 - benzoylamino - 7 - naphthol, 1-(2' - chlorobenzoylamino) - 7 - naphthol, 1-(4' - chlorobenzoylamino) - 7 - naphthol, 1 - (4'-methylbenzoylamino) - 7 - naphthol, 1 - (2',5'-dimethylbenzoylamino) - 7 - naphthol, 1 - (7-hydroxynaphthyl)-carbamic acid-ethyl-glycol ester, 1-(7-hydroxynaphthyl)-carbamic acid-ethyl ester, 1 - (7 - hydroxynaphthyl) - carbamic acid-benzyl ester, etc.

Coupling the new diazo components with the 1-acylamino-7-naphthols produces good yields of azo dyestuffs which, when dried and ground, form dark blue powders which dissolve in concentrated sulphuric acid with bluish-red coloration; they are excellent dyestuffs for the after-chroming process; most of them are particularly suitable for the neutral single bath chroming process.

The following examples illustrate the invention

EXAMPLE 1

26.4 parts of 2-aminophenol-4-sulfonic acid-anilide are diazotized with 6.9 parts of sodium nitrite and 25 parts of hydrochloric acid. The diazo compound which separates is filtered off and added to an ice cold solution of 28.7 parts of 1-(adipinyl-amino)-7-naphthol and 30 parts of sodium carbonate in 200 parts of water. After about 3 hours the coupling is finished. The monoazo dyestuff isolated in the usual way by salting out and filtration, forms a dark blue powder when dried, which dissolves in concentrated sulfuric acid with a Bordeaux red coloration. The dyestuff is an excellent dyestuff for the single bath chroming process and dyes wool from neutral baths and gives dyeings thereby of beautiful grey shades. It corresponds to the formula

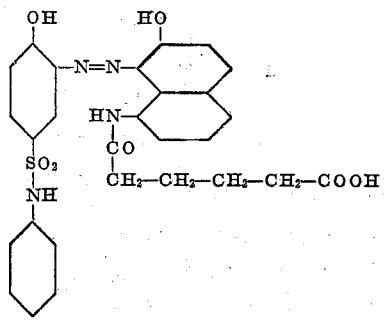

EXAMPLE 2

34.3 parts of 2-aminophenol-4-sulfonic acid-(3'-sulfamido)-anilide are diazotized in 120 parts water with 6.9 parts of sodium nitrite and 22 parts of 30% hydrochloric acid at 5–8° C. The diazo compound which separates out is filtered off and added to an ice cold solution of 201 parts of 1-acetylamino-7-naphthol, 4 parts of sodium hydroxide and 22 parts of sodium carbonate in 250 parts of water. The coupling is finished after a few hours. The new monoazo dyestuff is isolated in the usual way by salting out and filtration. When dried it forms a dark blue powder which dissolves in concentrated sulfuric acid with a reddish-blue coloration. It dyes wool both by the neutral bath chroming process and also by the after-chroming process in grey-blue shades. The dyestuff corresponds to the formula

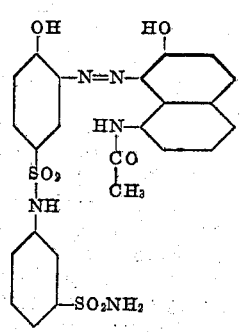

EXAMPLE 3

34.3 parts of 2-aminophenol-6-chloro-4-sulfoanthranilic acid are diazotized with 6.9 parts of sodium nitrite and 22 parts of 30% hydrochloric acid. When the diazotization is finished the diazo compound which separates is filtered off. 20.1 parts of 1-acetyl-amino-7-naphthol are dissolved in a mixture of 4 parts of sodium hydroxide and 200 parts of water and after the addition of 22 parts of sodium carbonate cooled to 0° C. The diazo compound which has been filtered off is added to this solution. After about 3 hours coupling is finished. The new monoazo dyestuff is isolated in the usual manner. It dyes wool, both by the neutral bath chroming process and also by the after-chroming process, in blue-grey shades.

EXAMPLE 4

30.8 parts of 2-amino-1-phenol-4-sulfanthranilic acid are diazotized and coupled with 27.5 parts of 1-(7-hydroxynaphthalene)-carbamic acid-ethylglycol ester dissolved in a mixture of 4 parts of sodium hydroxide and 250 parts of water in the presence of the calculated quantity of sodium carbonate. The dyestuff, which corresponds to the formula

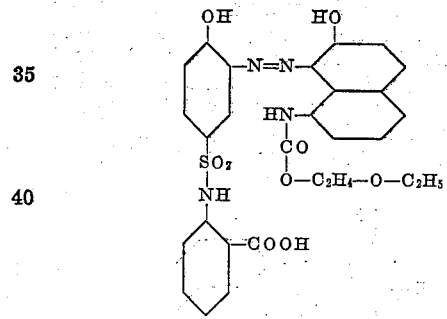

is salted out and filtered off. When dry it forms a dark blue powder which dissolves in concentrated sulfuric acid with a Bordeaux red color. The dyeings obtained on wool by the single bath chroming or the after-chroming methods show a grey-blue shade.

EXAMPLE 5

30.8 parts of 2-aminophenol-4-sulfanthranilic acid are diazotized with 6.9 parts of sodium nitrite and 22 parts of 30% hydrochloric acid. The diazo compound which separates is filtered off and added to an ice cold solution of 33.2 parts of 1-(2',5'-dichlorobenzoylamino)-7-naphthol, 4 parts of caustic soda, 22 parts of sodium carbonate and 250 parts of water. After the addition of 30 parts of pyridine the coupling is finished in about 4 hours. The new monoazo dyestuff, isolated in the usual way, dyes wool in grey shades both by the neutral single bath chroming process as well as by the after-chroming process.

The following table sets forth additional examples of dyestuffs according to the present invention, the process of preparation being essentially analogous to the process described in the preceding examples.

Table

| Diazo Component | Coupling Component | Color of Chrome Dyeing On Wool |
|---|---|---|
| 2-aminophenol-4-sulfanthranilic acid. | 1-benzoylamino-7-naphthol | blue-grey. |
| Do | 1-(2'-chlorobenzoylamino)-7-naphthol. | Do. |
| Do | 1-(4'-chlorobenzoylamino)-7-naphthol. | grey.[1] |
| Do | 1-chloracetylamino-7-naphthol | blue-grey. |
| Do | 1-acetylamino-7-naphthol | Do. |
| Do | 1-propionylamino-7-naphthol | Do. |
| Do | 1-(n-butyrylamino)-7-naphthol | Do. |
| Do | 1-(4'-methylbenzoylamino)-7-naphthol. | grey. |
| Do | 1-(2',5'-dimethylbenzoylamino)-7-naphthol. | blue-grey. |
| 2-aminophenol-4-sulfonic-acid-anilide-3'-carboxylic acid. | 1-(7-hydroxynaphthyl)-carbamic acid-ethyl-glycolester. | Do. |
| 2-aminophenol-4-sulfonic-acid-anilide-4'-carboxylic acid. | do | Do. |
| 2-aminophenol-4-sulfonic-acid-4'-chloranilide-3'-carboxylic acid. | do | Do. |
| 2-amino-6-chlorophenol-4-sulfanthranilic acid. | do | Do. |
| Do | 1-(7-hydroxynaphthyl)-carbamic acid-ethylester. | Do. |
| 2-aminophenol-4-sulfanthranilic acid. | do | Do. |
| 2-aminophenol-4-sulfonic acid anilide. | 1-sulfoacetylamino-7-naphthol | blue.[2] |
| 4-chloro-2-aminophenol-5-sulfanthranilic acid. | 1-(7-hydroxynaphthyl)-carbamic acid-ethylester. | blue-grey. |
| Do | 1-(7-hydroxynaphthyl)-carbamic acid-ethylglycol ester. | Do. |
| 4-chloro-2-aminophenol-5-sulfanthranilic acid. | 1-acetylamino-7-naphthol | Do. |
| 2-aminophenol-5-sulfanthranilic acid. | 1-(7-hydroxynaphthyl)-carbamic acid-ethylester. | Do. |
| Do | 1-(7-hydroxynaphthyl)-carbamic acid-ethyl-glycol ester. | Do. |
| Do | 1-acetylamino-7-naphthol | Do. |
| 2-aminophenol-4-sulfonic acid-anilide. | 1-succinylamino-7-naphthol | Do. |
| 2-aminophenol-4-sulfonic acid-p-toluidide. | 1-(7-hydroxynaphthyl)-carbamic acid-ethylglycol ester. | blue. |
| 2-aminophenol-4-sulfonic acid-(2'-sulfomethylamido)-anilide. | 1-acetylamino-7-naphthol | Do. |
| 2-aminophenol-4-sulfonic acid-p-xylidide. | 1-sulfoacetyl-amino-7-naphthol | blue-grey. |
| 2-aminophenol-4-sulfonic acid-p-ethyl-anilide. | 1-adipinylamino-7-naphthol | grey. |
| 2-aminophenol-4-sulfonic acid-p-propyl-anilide. | 1-(succinylamino)-7-naphthol | Do. |
| 2-aminophenol-4-sulfonic acid-o-chlor-anilide. | do | Do. |
| 2-aminophenol-4-sulfonic acid-p-brom-anilide. | 1-sulfoacetyl-amino-7-naphthol | blue-grey. |
| 2-amino-6-bromo-phenol-4-sulfanthranilic acid. | 1-(acetylamino)-7-naphthol | Do. |
| 2-aminophenol-4-sulfonic acid-(2'-sulfodiethylamido)-anilide. | do | blue. |
| 2-aminophenol-4-sulfonic acid-(2'-sulfoethylamido)-anilide. | do | Do. |
| 2-aminophenol-4-sulfanthranilic acid. | 1-(7-hydroxynaphthyl)-carbamic acid benzylester. | blue-grey. |

[1] This dyestuff corresponds to the formula

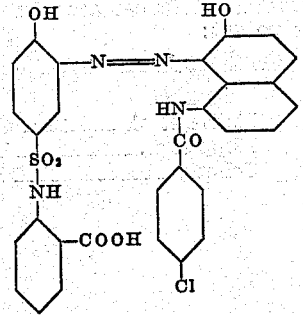

[2] This dyestuff corresponds to the formula

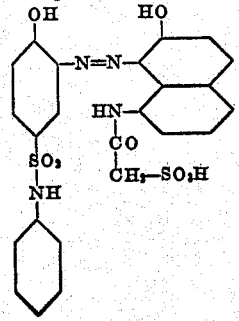

Having thus disclosed the invention, what is claimed is:

1. A monoazo dyestuff corresponding to the formula

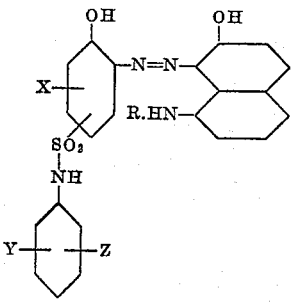

wherein X stands for a member selected from the group consisting of hydrogen, chlorine and bromine, Y and Z each stand for a member selected from the group consisting of hydrogen, lower alkyl, chlorine, bromine, —COOH, —$SO_2NH_2$, —$SO_2$.NH-lower-alkyl and —$SO_2$.N-(lower-alkyl)$_2$, and wherein R stands for a member selected from the group consisting of —CO-lower alkyl, —CO-lower alkylene-COOH, —CO-mononuclear aryl, —CO—$CH_2$—$SO_3H$, —CO—$CH_2$—Cl —COO-lower alkyl, —COO-lower alkylene-O-lower alkyl and —COO-benzyl.

2. The monoazo dyestuff corresponding to the formula

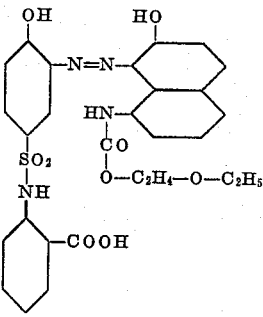

3. The monoazo dyestuff corresponding to the formula

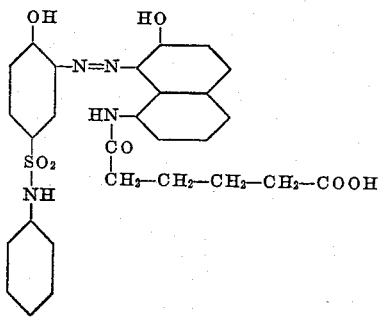

4. The monoazo dyestuff corresponding to the formula

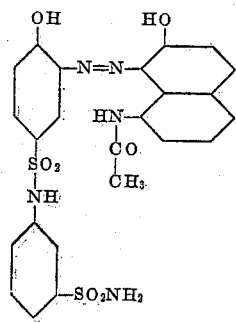

5. The monoazo dyestuff corresponding to the formula

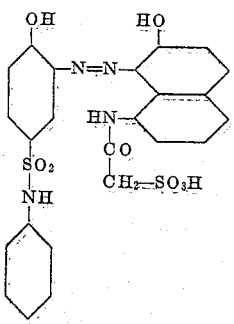

6. The monoazo dyestuff corresponding to the formula

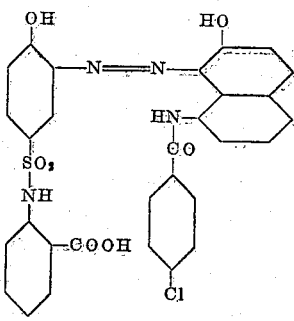

WILLY STEINEMANN.

REFERENCES CITED

The following references are of record in the file of this patent:

UNITED STATES PATENTS

| Number | Name | Date |
|---|---|---|
| 1,005,233 | Kothe et al. | Oct. 10, 1911 |
| 2,024,864 | Kopp et al. | Dec. 17, 1935 |
| 2,551,056 | Schetty | May 1, 1951 |